US009429438B2

(12) United States Patent
Weng et al.

(10) Patent No.: US 9,429,438 B2
(45) Date of Patent: Aug. 30, 2016

(54) UPDATING MAP DATA FROM CAMERA IMAGES

(75) Inventors: Jianfeng Weng, Kanata (CA); Xin Jin, Waterloo (CA); David Steer, Nepean (CA)

(73) Assignee: BlackBerry Limited, Waterloo (CA)

( * ) Notice: Subject to any disclaimer, the term of this patent is extended or adjusted under 35 U.S.C. 154(b) by 784 days.

(21) Appl. No.: 12/977,394

(22) Filed: Dec. 23, 2010

(65) Prior Publication Data

US 2012/0166074 A1 Jun. 28, 2012

(51) Int. Cl.
*G01C 11/00* (2006.01)
*G01C 21/32* (2006.01)

(52) U.S. Cl.
CPC ................................ *G01C 21/32* (2013.01)

(58) Field of Classification Search
CPC combination set(s) only.
See application file for complete search history.

(56) References Cited

U.S. PATENT DOCUMENTS

| | | | |
|---|---|---|---|
| 6,285,317 B1 | 9/2001 | Ong | |
| 6,314,370 B1 * | 11/2001 | Curtright | G01C 21/20 340/990 |
| 6,377,210 B1 * | 4/2002 | Moore | G01C 21/26 342/357.4 |
| 6,496,778 B1 | 12/2002 | Lin | |
| 6,526,352 B1 | 2/2003 | Breed et al. | |
| 6,832,156 B2 * | 12/2004 | Farmer | B60W 30/16 340/435 |
| 7,042,345 B2 * | 5/2006 | Ellis | A61H 3/061 340/436 |
| 7,451,041 B2 | 11/2008 | Laumeyer et al. | |
| 7,751,805 B2 | 7/2010 | Neven | |
| 7,796,081 B2 * | 9/2010 | Breed | B60N 2/2863 340/435 |
| 7,865,267 B2 * | 1/2011 | Sabe | G06K 9/00201 345/419 |
| 8,509,488 B1 * | 8/2013 | Enge | G01C 21/3623 382/106 |
| 8,649,565 B1 * | 2/2014 | Kim | G06K 9/00369 382/106 |
| 9,198,004 B2 * | 11/2015 | Das | G01C 21/206 |
| 9,206,023 B2 * | 12/2015 | Wong | B66F 9/063 |
| 2002/0122564 A1 * | 9/2002 | Rhoads | G01C 11/00 382/100 |
| 2003/0182052 A1 * | 9/2003 | DeLorme | G01C 21/26 701/533 |
| 2003/0215110 A1 * | 11/2003 | Rhoads | G01C 11/00 382/100 |
| 2004/0117358 A1 * | 6/2004 | von Kaenel | G06F 17/30241 |
| 2005/0020902 A1 * | 1/2005 | Janes | A61B 6/032 600/407 |
| 2005/0068450 A1 * | 3/2005 | Steinberg | G06K 9/346 348/335 |

(Continued)

FOREIGN PATENT DOCUMENTS

| | | |
|---|---|---|
| EP | 2214122 A1 | 8/2010 |
| WO | 2006132522 A1 | 12/2006 |

(Continued)

OTHER PUBLICATIONS

1. Bosch GPS Concept: http://www.gpsmagazine.com/2009/01/.

(Continued)

*Primary Examiner* — Jonathan L Sample
(74) *Attorney, Agent, or Firm* — Moffat & Co.

(57) ABSTRACT

A method of updating map data entails capturing an image using a camera, determining a location of an object in the image, creating new map data to represent the object in the image, and updating a map database to include the new map data for the object in the image. This method may be implemented on a GPS-enabled wireless communications device having an onboard camera which can transmit the new map data to a map server for updating its map database. Determining the position of the object in the image relative to the wireless device may be accomplished using a rangefinder and compass, triangulation of multiple images of the object, or a stereoscopic camera. The accuracy of the GPS position fix may be improved by capturing images of recognizable objects for which location coordinates are available.

17 Claims, 17 Drawing Sheets

(56) References Cited

U.S. PATENT DOCUMENTS

| | | | |
|---|---|---|---|
| 2005/0131581 A1* | 6/2005 | Sabe | G06K 9/00201 700/245 |
| 2005/0185060 A1 | 8/2005 | Neven, Sr. | |
| 2007/0124064 A1* | 5/2007 | Fukui | G01C 21/32 701/532 |
| 2008/0120122 A1* | 5/2008 | Olenski | G01C 15/00 705/1.1 |
| 2008/0268876 A1 | 10/2008 | Gelfand | |
| 2009/0005961 A1* | 1/2009 | Grabowski | G01C 21/365 701/532 |
| 2009/0141966 A1* | 6/2009 | Chen | G06T 7/0028 382/154 |
| 2009/0216446 A1* | 8/2009 | Ma | G01C 21/20 701/469 |
| 2009/0228204 A1* | 9/2009 | Zavoli | G01C 21/30 701/532 |
| 2009/0237510 A1* | 9/2009 | Chen | G06K 9/209 348/159 |
| 2010/0066814 A1 | 3/2010 | Su | |
| 2010/0070125 A1* | 3/2010 | Lee | G06T 7/0042 701/28 |
| 2010/0118025 A1* | 5/2010 | Smith | G06Q 30/02 345/418 |
| 2010/0149399 A1* | 6/2010 | Mukai | G01C 21/20 348/333.02 |
| 2010/0176987 A1* | 7/2010 | Hoshizaki | G01S 19/48 342/357.23 |
| 2010/0188407 A1* | 7/2010 | Nielsen | G06Q 10/06 345/440 |
| 2010/0189312 A1* | 7/2010 | Nielsen | G01C 15/02 382/113 |
| 2010/0313148 A1* | 12/2010 | Hochendoner | G06F 3/0481 715/759 |
| 2011/0172913 A1* | 7/2011 | Nakamura | G01C 21/32 701/532 |
| 2011/0237274 A1* | 9/2011 | Wong | G01S 1/68 455/456.1 |
| 2011/0310087 A1* | 12/2011 | Wright, Jr. | G06T 13/80 345/419 |
| 2012/0011119 A1* | 1/2012 | Baheti et al. | 707/737 |
| 2012/0011142 A1* | 1/2012 | Baheti | G06K 9/4671 707/769 |
| 2012/0045093 A1* | 2/2012 | Salminen | G06K 9/00295 382/103 |
| 2012/0094596 A1* | 4/2012 | Tysowski | G06Q 10/10 455/41.1 |
| 2012/0094597 A1* | 4/2012 | Tysowski | G06Q 30/06 455/41.1 |
| 2012/0140061 A1* | 6/2012 | Zeng | 348/135 |
| 2012/0154557 A1* | 6/2012 | Perez | H04N 21/25891 348/53 |
| 2012/0259540 A1* | 10/2012 | Kishore | G06Q 10/06 701/410 |
| 2012/0300089 A1* | 11/2012 | Sbaiz et al. | 348/222.1 |
| 2013/0162665 A1* | 6/2013 | Lynch | G09B 29/106 345/589 |

FOREIGN PATENT DOCUMENTS

| | | |
|---|---|---|
| WO | 2009080070 A1 | 7/2009 |
| WO | 2009098154 A1 | 8/2009 |
| WO | 2010/069380 A1 | 6/2010 |

OTHER PUBLICATIONS

3D GPS Maps GPS Review http://www.gpsreview.net/3d-gps-maps/. This page shows GPS navigation systems to provide 3D data in their maps (either 2D data with a viewing angle or real 3D data).
http://www.pocketpcaddict.com/forums/software-related-pressreleases/20427-googlenavigator-google-earth-3d-gps-navigation-yourpocket-pc.html.
http://www.icircuits.com/prod_osd_main.html.
• http://portal.acm.org/citation.cfm?id=1459522&dl=GUIDE&coll=GUIDE&CFID=100012335&CFTOKEN=49910225.
www.tineye.com.
European Search Report from corresponding EP Application dated Jul. 1, 2011.
Wikipedia: "Triangulation", Dec. 7, 2010, Retrieved from the Internet: URL:http://en.wikipedia.org/w/index.php?title=Triangulation&oldid=401024072 [retrieved on Jan. 28, 2013].
Wikipedia: "Stereo camera", Dec. 15, 2010, Retrieved from the Internet: URL:http://en.wikipedia.org/w/index.php?title=Stereo_camera&oldid=402478920 [retrieved on Jan. 28, 2013].
Vectronix: "Pocket Laser Range Finderwith Compass Option", Dec. 31, 2008, Retrieved from the Internet: URL:www.vectronix.ch/App/bin/down.php/352_4fea1d6015832367fcdde2c8832f52f8/PLRF_Brochure_EN.pdf [retrieved on Jan. 28, 2013].
Summons to attend Oral Proceedings dated Apr. 5, 2013 issued in corresponding European Patent Application No. 10196895.6.
Canadian Intellectual Property Office, Office Action, App. No. 2762743, Apr. 2, 2015.
Canadian Intellectual Property Office, Office Action on Application No. 2,762,743, Issued on Mar. 22, 2016.

* cited by examiner

UPDATING MAP DATA FROM CAMERA IMAGES

CROSS-REFERENCE TO RELATED APPLICATIONS

This is the first application filed for the present technology.

TECHNICAL FIELD

The present technology relates to map databases and, in particular, to methods for interacting with map databases using mobile devices.

BACKGROUND

Map databases store map data for one or more geographical regions. This map data is used to render digital two-dimensional maps or, more recently, three-dimensional renderings of geographical areas. The map data in the map databases is typically created from government documents and pre-existing maps, satellite or aerial imagery or from ground-based data-collection vehicles.

These map databases must be frequently updated as new roads, buildings, landmarks, points of interest, or other structures are built or removed. Updating map databases can be an arduous task, typically requiring new satellite or aerial imagery, or new ground-based data collection, etc. Map data inevitably becomes stale (out of date) when the geographical landscape changes (e.g. due to natural disaster or climate change) or when man-made features change (e.g. when new structures are built or old structures are demolished). Furthermore, detailed map data for remote or uninhabited areas may not be available.

Accordingly, there is a need in the industry to provide an improved technique for updating map data in a map database.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology provides an innovative technique for updating map data in a map database by capturing digital imagery. New map data is created for an object (such as a newly erected building) in the captured image. The location of this object is determined by knowing the current location of the device that took the digital photo (e.g. via a GPS position fix) and the position of the object in the photo relative to the device. The new map data corresponding to the new object may then be added to an existing map database to represent the new object that was previously not represented by any map data in the map database. This enables new objects or map features (whether they are man-made or natural) to be added to a map database. Mobile users may thus contribute map data to a map database by capturing images. This is useful when there are new landmarks, roads, buildings, etc. It is also useful for areas that have not been mapped or that have not been fully mapped in detail.

Thus, an aspect of the present technology is a method of updating map data, the method comprising capturing an image using a camera, determining a location of an object in the image, creating new map data to represent the object in the image, and updating a map database to include the new map data for the object in the image.

Another aspect of the present technology is a computer-readable medium (or machine-readable medium) comprising instructions in code which when loaded into memory and executed on a processor of a wireless communications device or mobile device causes the device to generate new map data by capturing an image using a camera, determining a location of an object in the image, creating new map data to represent the object in the image, and updating a map database to include the new map data for the object in the image.

Yet another aspect of the present technology is a mobile device or wireless communications device for updating map data. The device includes a camera for capturing an image, a Global Positioning System (GPS) receiver for determining a current location of the wireless communications device, and a memory for storing the image. The memory is operatively coupled to a processor for determining a location of an object in the image. The processor is configured to cause new map data representing the object in the image to be created.

The details and particulars of these aspects of the technology will now be described below, by way of example, with reference to the attached drawings.

Figure 1:
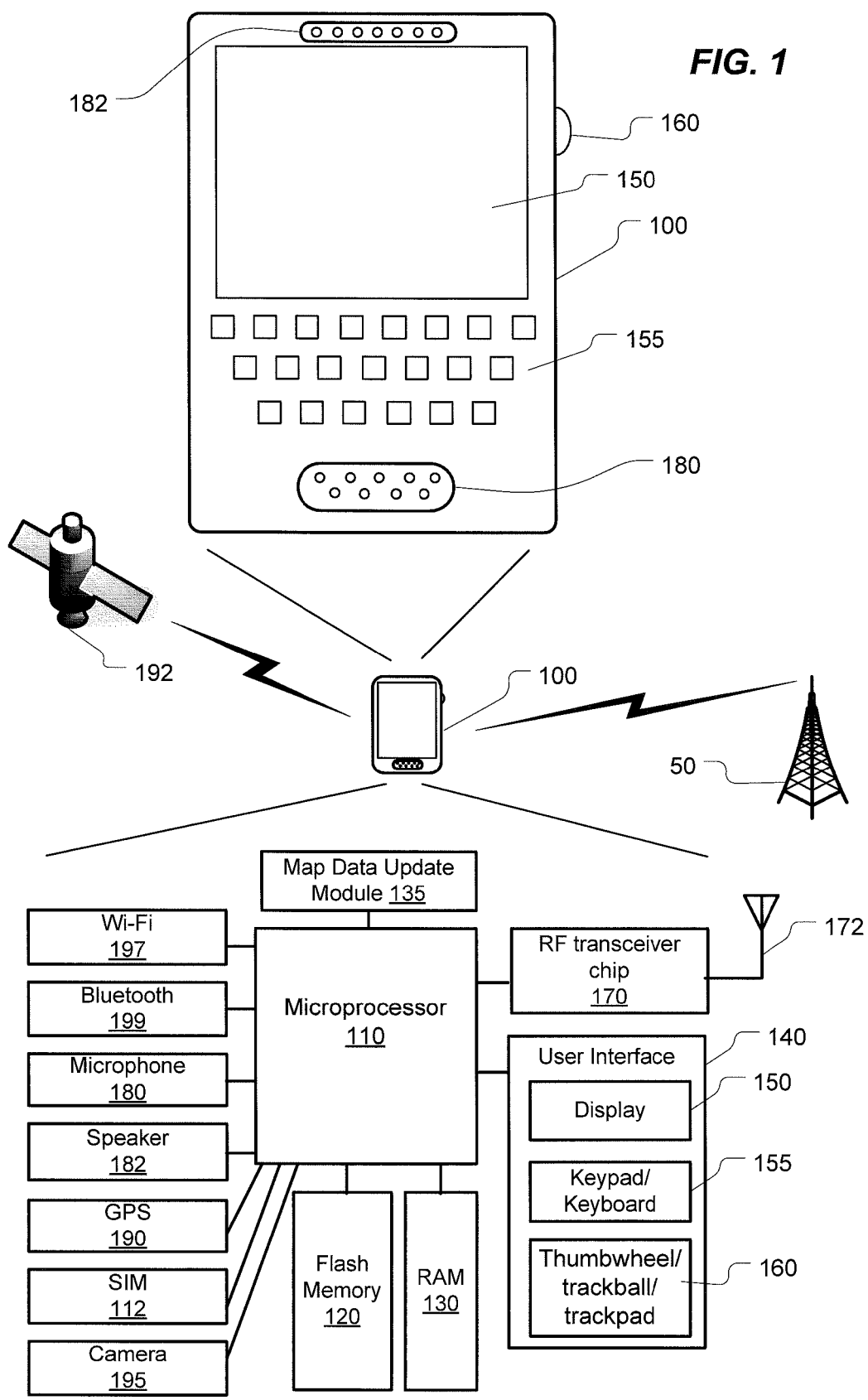
FIG. 1 depicts an example of a mobile device on which the present technology may be implemented.

FIG. 1 is a schematic depiction of a wireless communications device 100 as one example of a portable electronic device or mobile device on which the present technology can be implemented. The terms "mobile device" or "wireless communications device" are meant to encompass a broad range of cellular or other portable electronic devices such as, for example, smart phones, cell phones, satellite phones, wireless-enabled personal digital assistants (PDAs), wireless-enabled computing tablets, wireless-enabled laptops, e-readers, touch-screen pads, etc.

As shown schematically in FIG. 1, the wireless communications device 100 includes a microprocessor (referred to herein as a "processor") 110 operatively coupled to memory (Flash Memory 120 and/or RAM 130). The device may include a SIM card 112, R-UIM (Re-Useable Identification Module) or equivalent. The device 100 has a user interface 140 which includes a display (e.g. an LCD screen) 150, a keyboard/keypad 155. A thumbwheel, trackball, track pad (or optical jog pad) 160 may optionally be provided as part of the user interface. Alternatively, the user interface 140 may include a touch screen in lieu of, or in addition to, a keyboard/keypad. The wireless communications device 100 includes a radiofrequency (RF) transceiver chipset 170 for wirelessly transmitting and receiving data (e.g. map data) and voice communications, e.g. via a cellular network. The wireless communications may be performed using CDMA, GSM, EDGE, LTE or any other suitable communications standard or protocol. A microphone 180 and speaker 182 (and/or jack for earphones) may be provided for voice communications (although it should be appreciated that the present technology may be implemented on a mobile device that does not have any voice capability).

As further depicted in FIG. 1, the wireless communications device or mobile device 100 may include a GPS chipset or GPS receiver 190 (or other position-determining subsystem) to determine the current location of the device from radiofrequency signals emitted by a plurality of orbiting GPS satellites.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

References herein to "GPS" are meant to include Assisted GPS and Aided GPS.

The wireless communications device 100 may optionally also include a Wi-Fi transceiver 197 for connecting to a Wi-Fi station and/or a Bluetooth® transceiver 199 for short-range data transfer with another Bluetooth® device with which it has been paired.

Signals emitted by terrestrially based transmitting stations, such as cellular base stations, TV stations, or Wi-Fi access points can be also used in the determination of a mobile's location. Some base-station based location technologies are, for example, Qualcomm's hybrid solution, which can obtain a position fix using a few GPS satellites plus a few base stations. Emergency 911 (E911) phase 1 is based on cell ID, which uses base station location to approximate the user location, which might be not accurate. Depending on the positioning accuracy that is sought, another sort of position-determining subsystem may be contemplated, e.g. a Wi-Fi positioning subsystem or a radiolocation subsystem that determines its current location using radiolocation techniques. Although GPS is believed to provide the most accurate positioning, for other applications where precise positioning is not so important, the approximate location of the mobile device can be determined using Wi-Fi positioning or triangulation of signals from in-range base towers, such as used for Wireless E911. Wireless Enhanced 911 services enable a cell phone or other wireless device to be located geographically using radiolocation techniques such as (i) angle of arrival (ADA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

With reference still to FIG. 1, the novel wireless communications device 100 also includes a camera 195 for taking digital photographic images. The camera 195 may be an onboard, embedded digital camera (or a camera to which the device is externally connected by a wired or wireless connection, e.g. USB, Bluetooth®, etc.

To summarize, therefore, the novel wireless communications device 100 disclosed herein includes a camera 195 for capturing a photographic image. For operational efficiency, the camera should be a digital camera but the technique may also be implemented using a non-digital camera and a digital scanner. The device 100 also includes a GPS receiver 190 for determining a current location of the device 100, and a memory 120, 130 for storing the image(s). The memory 120, 130 is operatively coupled to a processor 110 for determining a location of an object in the image(s). Various techniques may be employed for locating the object in the image(s), as will be explained below. The processor 110 is furthermore configured to cause new map data representing the object in the image(s) to be created, as will also be explained in greater detail below. In one implementation, as shown by way of example in FIG. 1, the device 100 includes a map database update module to perform the steps of updating the map database as described herein. This map database update module may be, for example, a software module having code that is stored in the memory 120, 130 and runs on the processor 110 of the device 100 to enable the device 100 to accomplish the task(s) associated with updating the map data of a map database.

Figure 2:
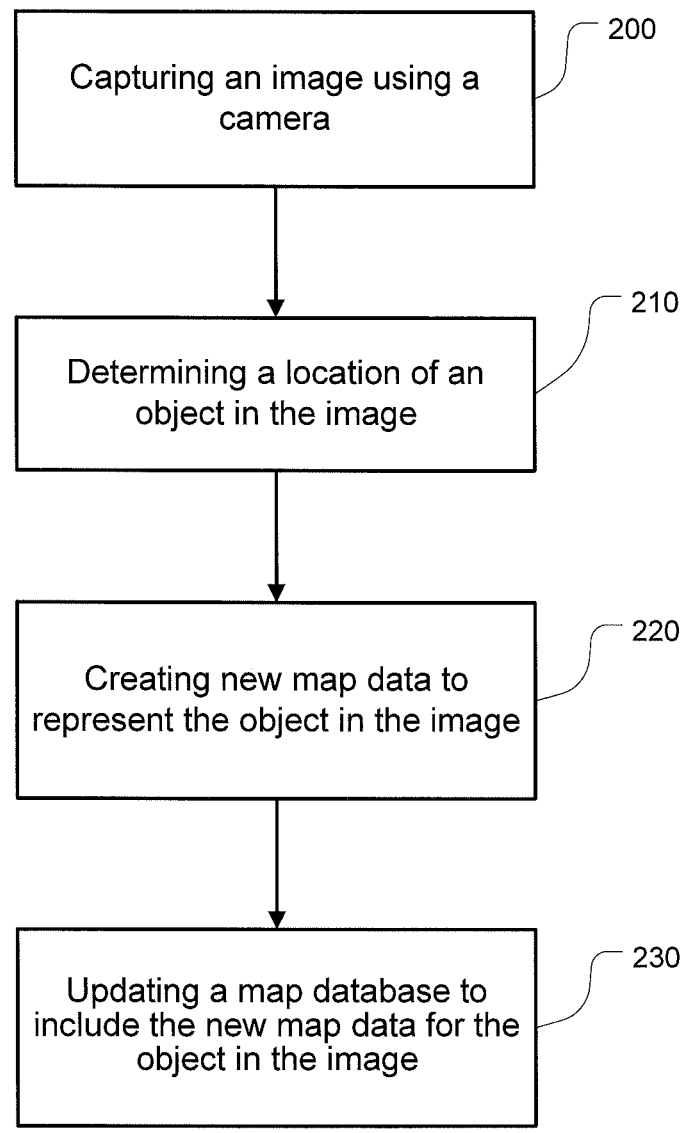
FIG. 2 depicts a flowchart of the main steps of a method of updating map data in accordance with implementations of the present technology.

As introduced above, a related aspect of this technology is a novel method of updating map data. As depicted in the flowchart of FIG. 2, this novel method entails capturing an image using a camera (step 200), determining a location of an object in the image (step 210), creating new map data to represent the object in the image (step 220), and updating a map database to include the new map data for the object in the image (step 230). In some implementations, the method includes a further step of validating the new map data before updating the map database.

Figure 3:
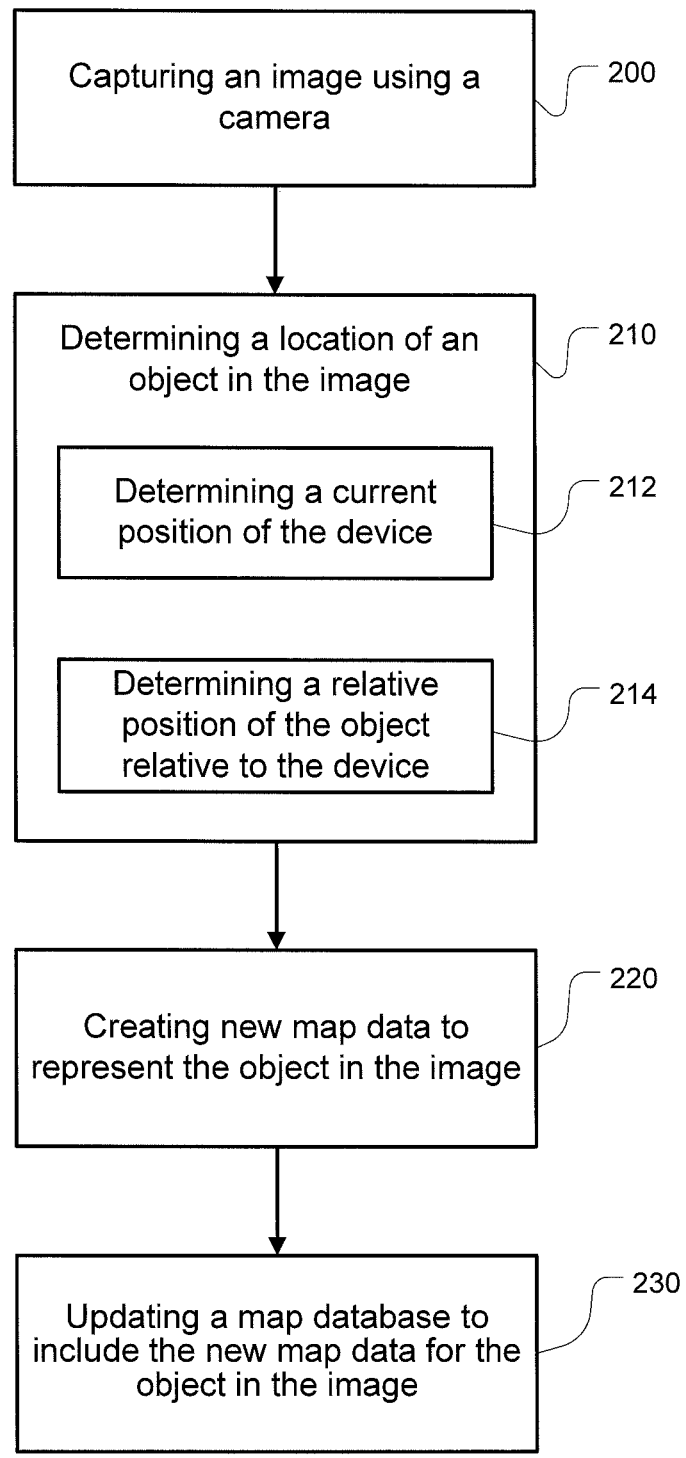
FIG. 3 depicts additional optional steps of the method of FIG. 2.

FIG. 3 shows a more detailed flowchart depicting sub-steps of the step 210 of determining the location of the object in the image. As depicted in FIG. 3, step 210 may include a sub-step 212 of determining a current position of a wireless communications device using, for example, a GPS receiver in the wireless communications device and a sub-step 214 of determining a relative position of the object relative to the current position of the wireless communications device.

In one implementation, the step of determining the relative position of the object comprises using multiple images to triangulate the relative position of the object.

In one implementation, the step of determining the relative position of the object comprises using a stereoscopic camera to determine the relative position of the object.

In another implementation, the step of determining the relative position of the object comprises using a rangefinder (e.g. laser, radar, infrared beam, or any other wave-emitting and receiving device) and compass sensor to determine the relative position of the object. In one implementation, the GPS receiver 190 itself provides the compass heading, e.g., while moving. Alternatively, the orientation of the camera when taking the picture is determined through a combination of previous GPS position and heading and sensor reported parameters, such as those reported by a gyro sensor and/or a accelerometer sensor.

Figure 4:
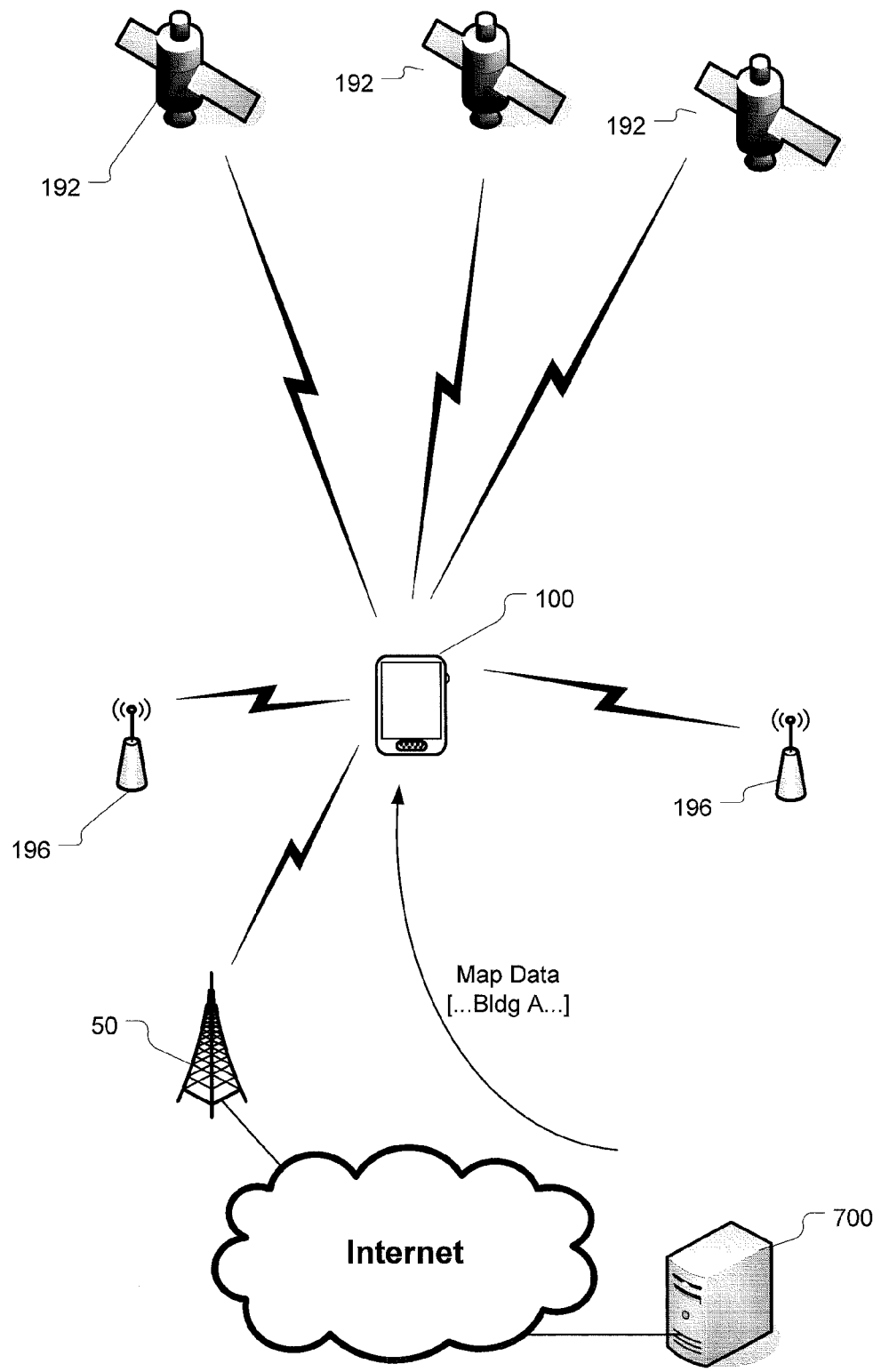
FIG. 4 depicts an example of a mobile device receiving map data for its current location.

FIG. 4 depicts an example of a mobile device 100 receiving map data for its current location. In this figure, mobile device 100 may determine its position using its GPS receiver provided there is reception of GPS signals from at least three (for a 2D fix) or four (for a 3D fix) orbiting satellites 192. Although it may be less accurate than GPS, Wi-Fi positioning (based on nearby Wi-Fi stations 196) may also be used to determine the position of the mobile device 100 provided the mobile device 100 has a Wi-Fi transceiver 197. Other location technology may also be used (not shown). Map data for the area surrounding the current location of the mobile device 100 is delivered from a map server 700 via the Internet and a wireless network (represented schematically by base station tower 50) to the mobile device 100. The map data received by the mobile device 100 is then rendered onscreen.

Figure 5:
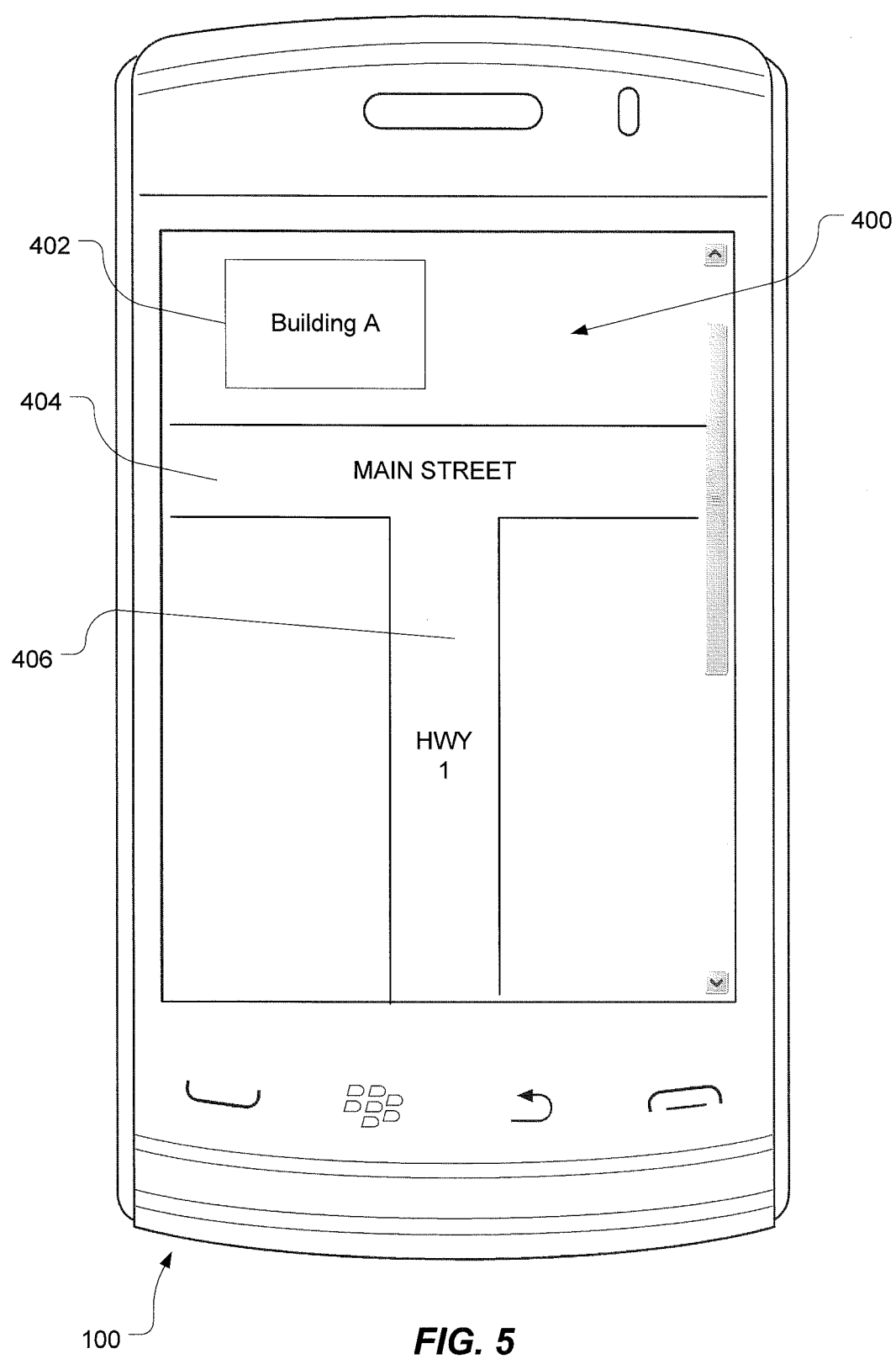
FIG. 5 depicts an example of a mobile device displaying a map of an area surrounding its current location.

FIG. 5 depicts an example of a mobile device 100 displaying a map 400 that has been rendered onscreen based on map data that has been delivered either over the air or cabled up from the map server 700 shown in FIG. 4. The map 400, in the example depicted in FIG. 5, presents a two-dimensional graphical representation 402 of Building A, a graphical representation 404 of Main Street and a graphical representation 406 of Highway 1. In this example, the map 400 in FIG. 5 is inaccurate because a new building ("Building B") has been constructed beside Building A on Main Street. The map database is thus out of date. There is no graphical representation for Building B on the map 400 because the map data for Building B has not yet been added to the map database at map server 700. Using conventional satellite or aerial imagery (or conventional ground-based data collection), the map data representing Building B will not be updated until the next time data is collected. Given the cost and time of making satellite, aerial or even ground-based data-collection passes, this might not occur for a long time, e.g. a number of months, during which time the map database will remain out of date. Any maps (of the area where Building B has been erected) that are rendered using this map database during this period will inevitably be inaccurate. The present technology addresses this technical problem by enabling a mobile device to create new map data for updating a map database based on digital imagery that is collected using a camera on the mobile device. In general, this is done by taking digital photos, determining the location of objects in the photos, and then creating new map data for objects that are not already represented by the existing map data. Implementations of this technology will be best understood with reference to the following figures.

Figure 6:
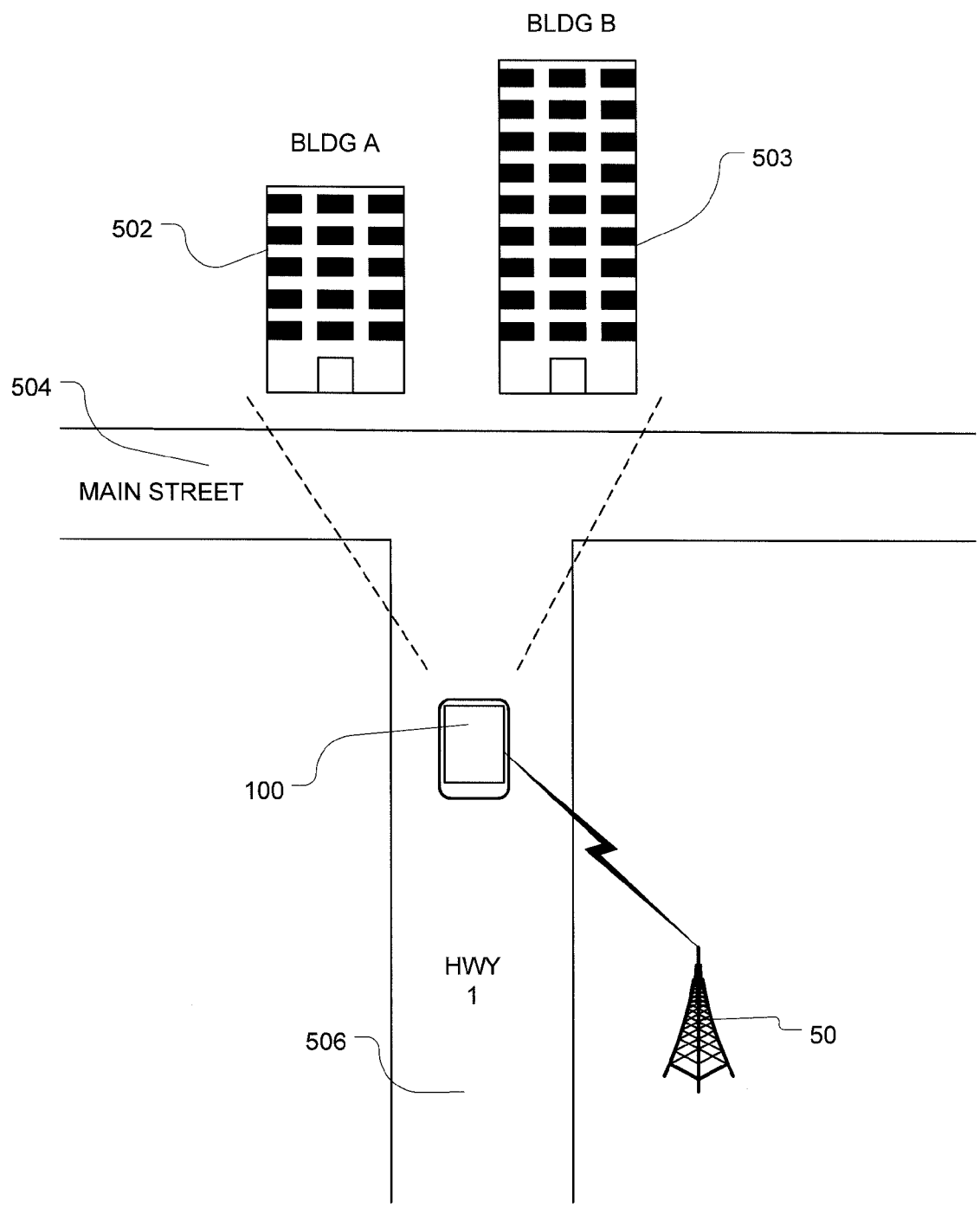
FIG. 6 depicts an example of an actual physical environment in which the mobile device is situated.

FIG. 6 depicts an example of an actual physical environment in which the mobile device 100 is situated. In this example, the mobile device 100 is situated on Highway 1 (referenced by numeral 506). The mobile device 100 is facing Main Street (represented by numeral 504). On Main Street is Building A (represented by numeral 502) and newly erected Building B (represented by numeral 503). Note that the actual, real-life Building A, which is designated by reference numeral 502, corresponds to the graphical representation 402 of Building A on the map 400 in FIG. 5. Similarly, the actual roadway Main Street, designated by numeral 504, corresponds to the graphical representation 404 of Main Street on the map 400. Similarly, the actual roadway Highway 1, designated by numeral 506, corresponds to the graphical representation 406 of Highway 1 on the map 400. Since Building B, designated by numeral 503 is not yet in the map database at map server 700, there is no graphical representation for Building B on the map 400.

As shown in FIG. 6, the mobile device 100 takes a digital photo of its surroundings. In this example, the digital photo is taken of Building A (designated by numeral 502) and Building B (designated by numeral 503).

Figure 7:
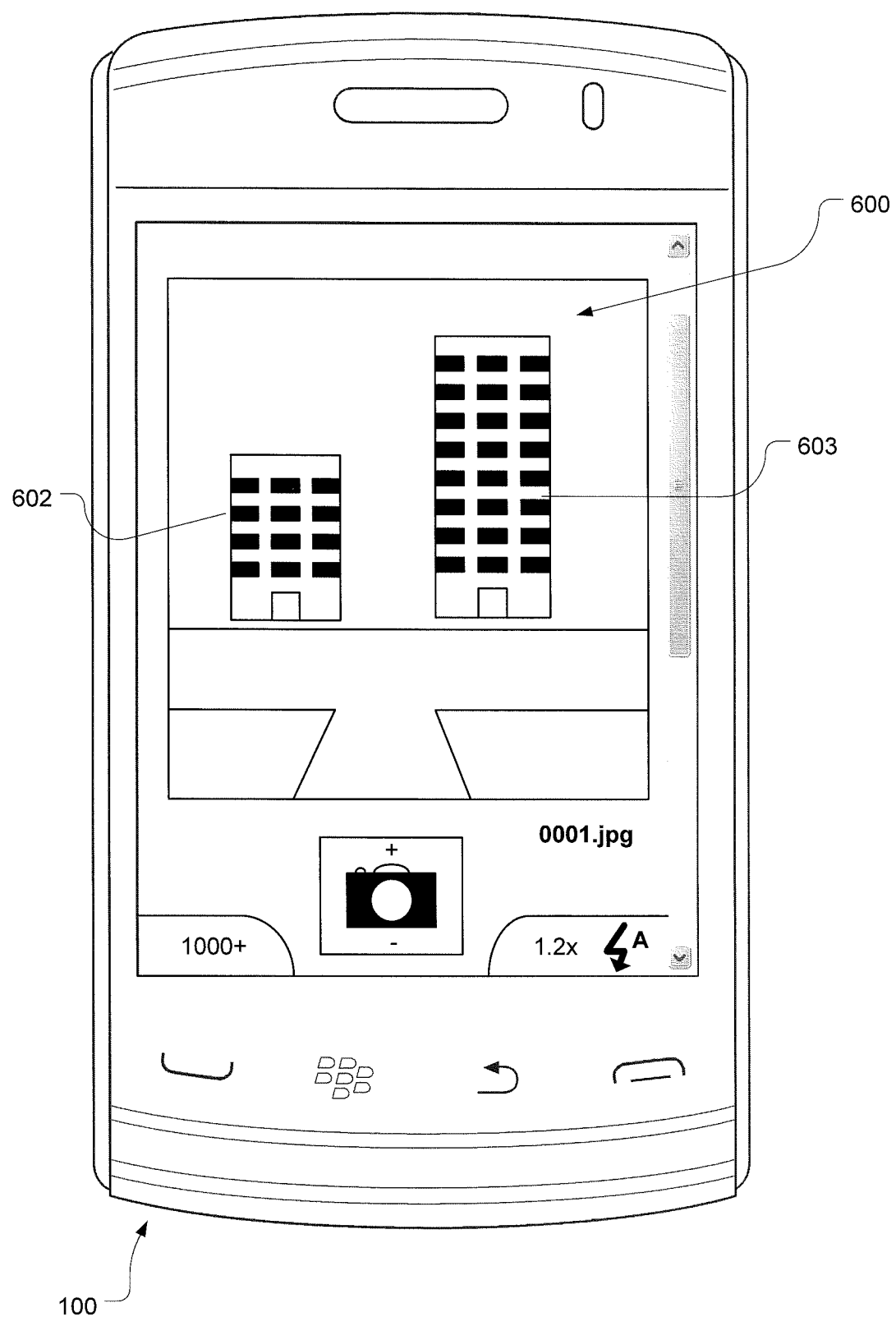
FIG. 7 depicts an example of a photograph taken by the mobile device of the surrounding physical environment.

FIG. 7 depicts an example of a photograph (or photographic image) taken by the mobile device 100 of the surrounding physical environment. In this case, as noted above, the image 600 shows Building A and Building B, as well as Main Street and a portion of Highway 1. The image 600 contains an image portion 602 showing Building A and an image portion 603 showing Building B.

Figure 8:
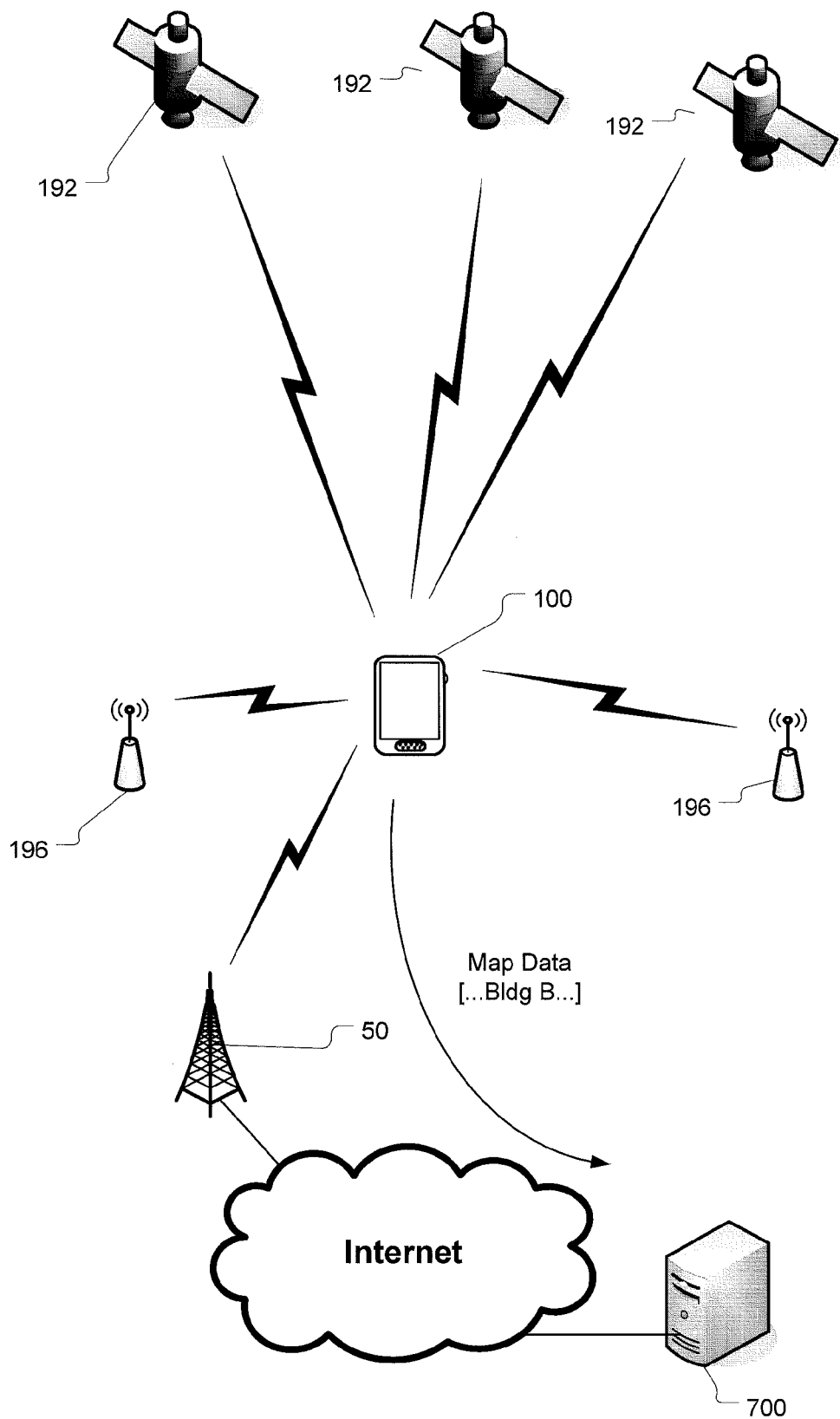
FIG. 8 depicts an example of a method by which new map data created from imagery captured by the mobile device is delivered back to the map server to update the map database.

FIG. 8 depicts an example of a method by which new map data obtained by the mobile device 100 is delivered back to the map server 700 to update the map database stored on the map server 700. As shown in FIG. 8, determining the location of an object requires that the mobile device determine its current position (e.g. using GPS) and determine a relative position of the object in the image (i.e. relative to its current position). Once an object's position is determined, a comparison with existing map data reveals whether this object is new to the map database or whether it already exists in the map database. New map data (for any new object) can then be added to the map database to thereby enrich the content of the database.

As shown in FIG. 8, updating the map database may involve transmitting the new map data to the map server 700 hosting the map database. Uploading the new map data may be done wirelessly using, for example, the RF transceiver 170 or the Wi-Fi transceiver 199. The new map data may also be uploaded by connecting the mobile device 100 via a wired connection, e.g. via a USB connection to a networked desktop computer.

Figure 9:
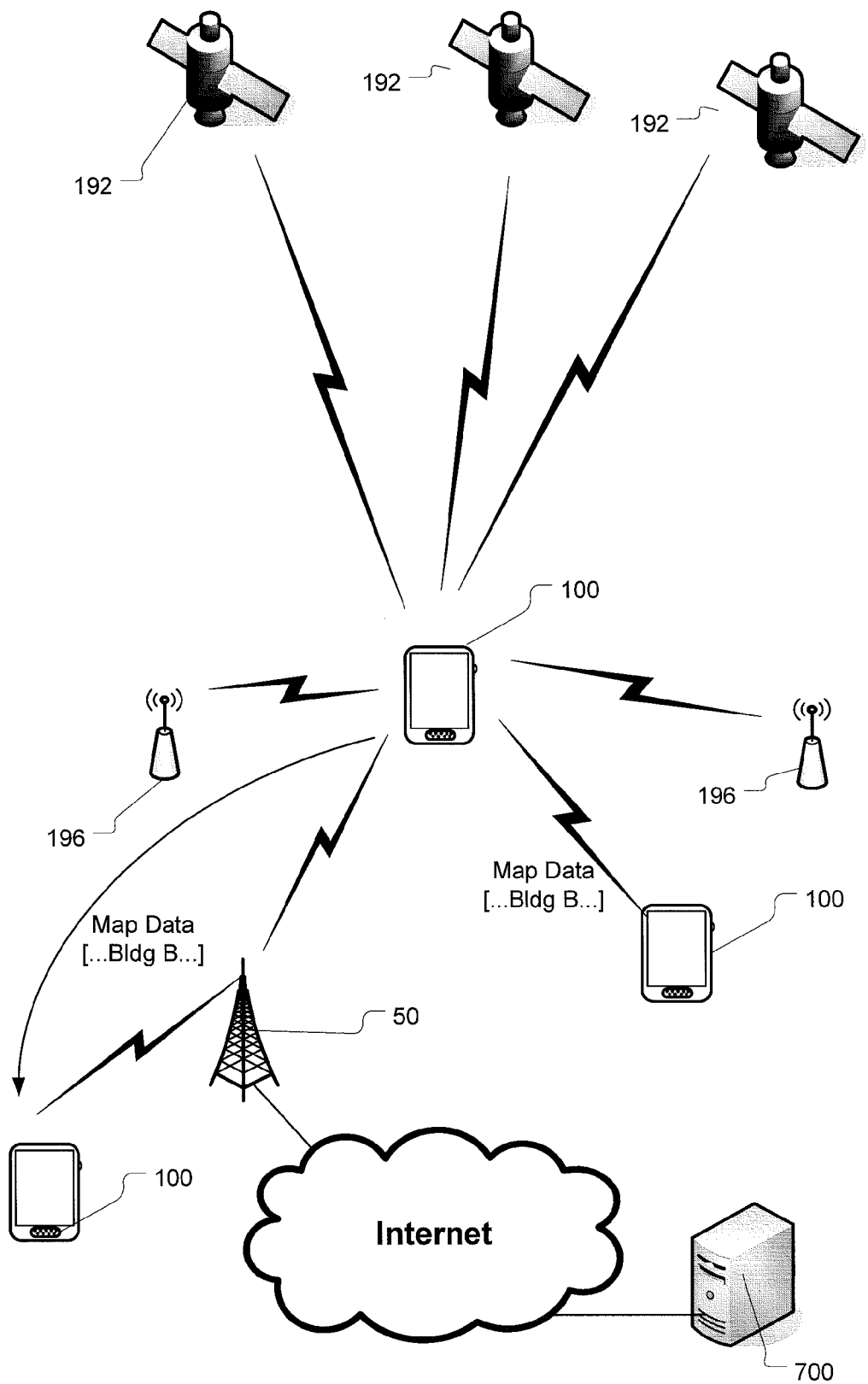
FIG. 9 depicts an example of another method by which new map data created from imagery captured by the mobile device is shared with other mobile devices.

Alternatively, as shown in FIG. 9, new map data may be shared with other mobile devices. In other words, updating the map database may involve updating a local map database stored on any one or more mobile devices or a database that is distributed over a multiplicity of mobile devices. This would enable a group of mobile users to define an ad hoc network or user group to share map data of an area of common interest. Map data may be shared with nearby mobile devices using a Bluetooth® transceiver 199 or any other short-range wireless technology such as WiFi (IEEE 802.11), ZigBee® (IEEE 802.15.4-2003). Map data could also be shared with other mobile devices using a wireless personal area network (WPAN), an infrared transceiver or an ultra-wideband transceiver.

Determining the location of an object in an image may be performed by the mobile device or it may be offloaded to a server (e.g. 700 in the network). If it is offloaded to a server, the device may simplify the image to reduce the amount of data being transmitted. In one implementation, the device may provide a low-resolution photo file to the server for calculation. In a variant, the mobile device may convert the photo into a wire mesh image showing only lines representing the edges of the new objects.

Likewise, determining whether an object is already accounted for in the map data of the map data may be done by the mobile device or offloaded to a server. Similarly, the creation of new map data for a new object can be done by the mobile device or offloaded to a server (which may or may not be the map server itself).

In one implementation, only designated (authorized) users may update the map database. Authorized users may upload new map data to the map database by logging in with their credentials, using a private key, or other cryptographic techniques for restricting write/edit access to the database. In another implementation, any user may contribute new map data (an open "wiki map" concept).

Figure 10:
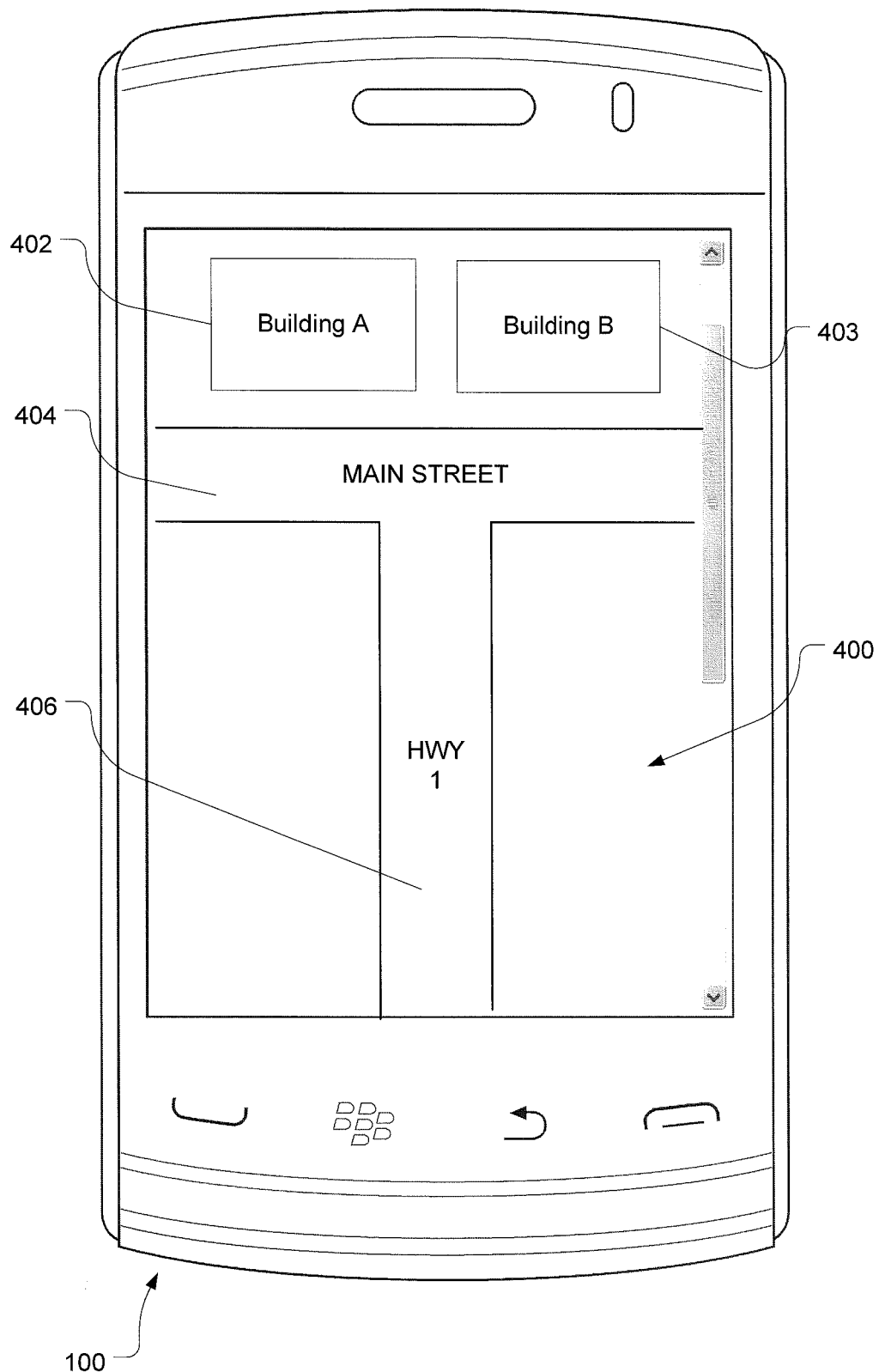
FIG. 10 depicts an example of an updated map displayed on the mobile device wherein the updated map includes map data for a newly constructed building that was not previously displayed on the map shown in FIG. 5.

Once the map database has been updated, subsequent requests for map data may include the new map data for the new object, such as the new Building B. FIG. 10 depicts an example of an updated map 400 displayed on the mobile device 100 wherein the updated map 400 includes map data for the newly constructed Building B (now designated by numeral 403) that was not previously found in the map 400 shown in FIG. 5.

Various techniques may be used to determine the position of the object relative to the current location of the mobile device 100. These techniques may involve geometric calculations based on triangulation based on multiple images, stereoscopic images, focal-length techniques, etc. Other techniques may rely upon a laser rangefinder for laser detection and ranging (LIDAR), radar, infrared beam, or other such wave-reflection technique.

Figure 11:
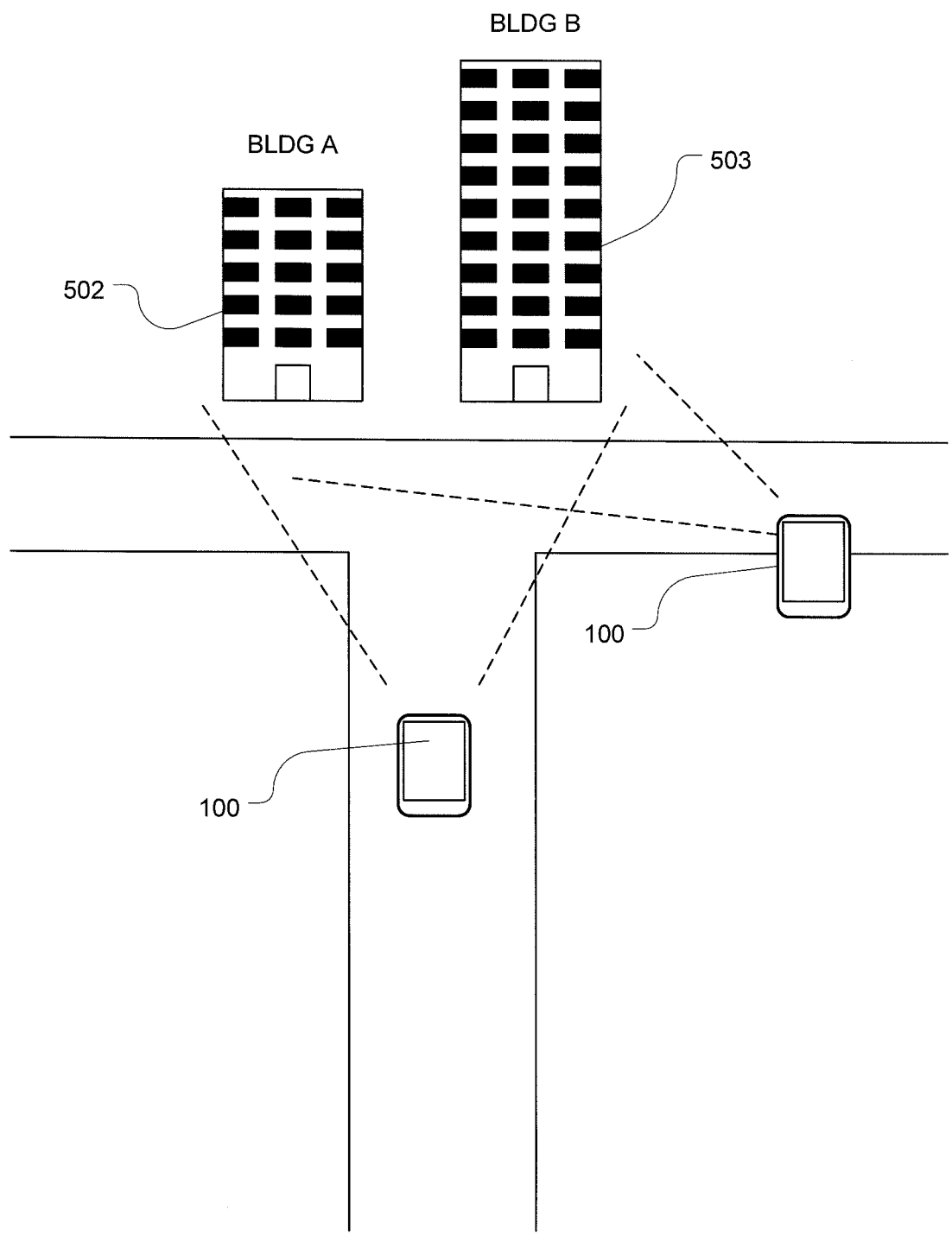
FIG. 11 depicts a triangulation technique for determining the position of a common object in two photographic images taken by the same mobile device.

FIG. 11 depicts a triangulation technique for determining the position of a common object in two photographic images taken by the same mobile device 100. In a variant, the mobile device 100 can take three or more photos of the same object. In another variant, two different mobile devices can take one photo each of the same object from different locations and then pool or share the geotagged photos for triangulation. Knowing its position and taking a picture that includes the image of a previously known object (e.g. Building A), a mobile device may also determine the new object location.

In monocular optics, the principles of the rangefinding camera may be used. The so-called looming equation assumes a constant focal length f. The size of a projection of an object onto the focal plane depends on the distance between the object and the camera. The object's image height $p0$ is obtained from the image. Its corresponding distance $d0$ is unknown. By moving the camera a known distance $\Delta d$ and taking another picture, the image height $p1$ can be obtained from the second image. Its corresponding distance $d1$ is unknown but is equal to $d0+\Delta d$. However, since $\Delta d$ is known (here, $\Delta d$ is mechanically adjusted by the camera itself to move the lens back by a small amount). With known $\Delta d$, $p0$, $p1$, the unknown $d0$ can be easily calculated by using the equations $$d1=-p0\ \Delta d/(p1-p0),\ d0=-p1\ \Delta d/(p1-p0).$$

Figure 12:
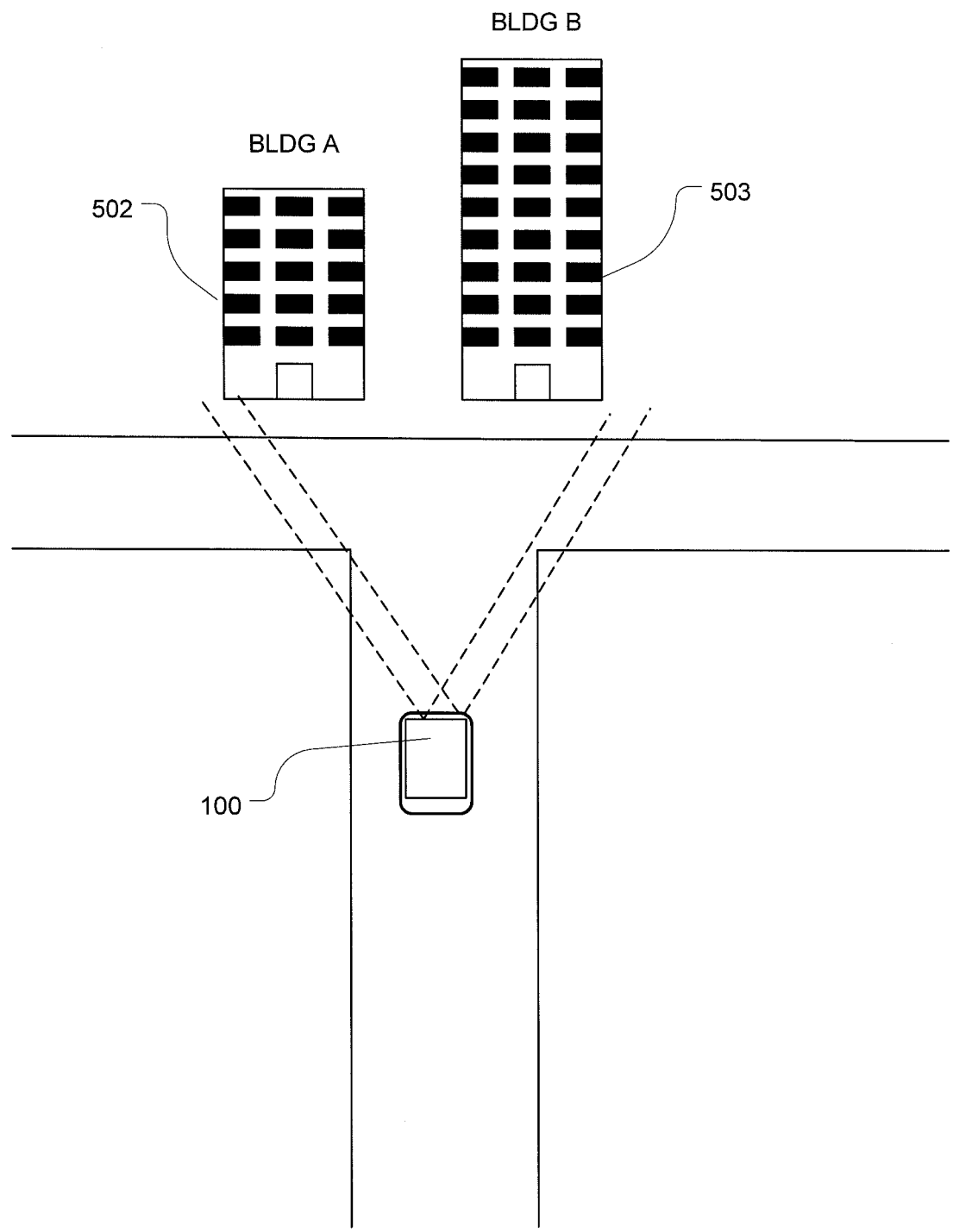
FIG. 12 depicts a rangefinding technique based on a stereoscopic camera on the mobile device.
Figure 13:
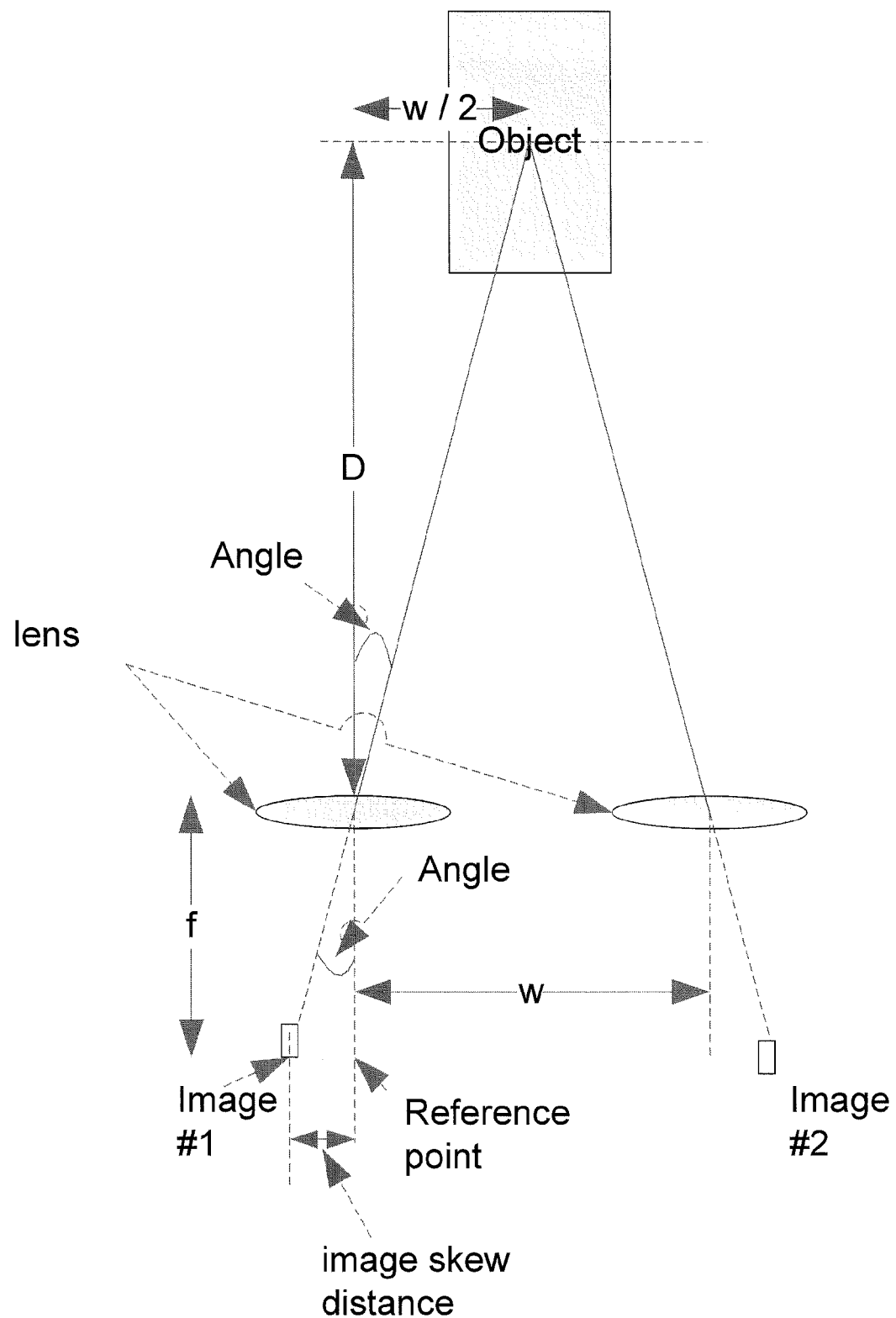
FIG. 13 depicts the geometrical analyses for binocular (stereoscopic) cameras.

FIG. 12 depicts a rangefinding technique based on a stereoscopic camera on the mobile device. FIG. 13 depicts the geometrical analysis for this type of stereoscopic (binocular) camera. This binocular range-finding technique utilizes the formula $f/h=D/H$. FIG. 13 shows an object and its two images from two lenses. Two images are compared and an internal adjustment is made as if the object were in the middle of the two lenses. An image skew distance between each image and its reference point can be measured. With the known focal length, the angle can be calculated. Note that $\tan(\text{angle})=\text{imageSkewDistance}/f=w/2/D$ where imageSkewDistance is measured as mentioned previously, w is the distance between two lenses (known a priori), f is the focal length (also known a priori), D is the distance, which is unknown. From the above equation, D can be calculated.

Figure 14:
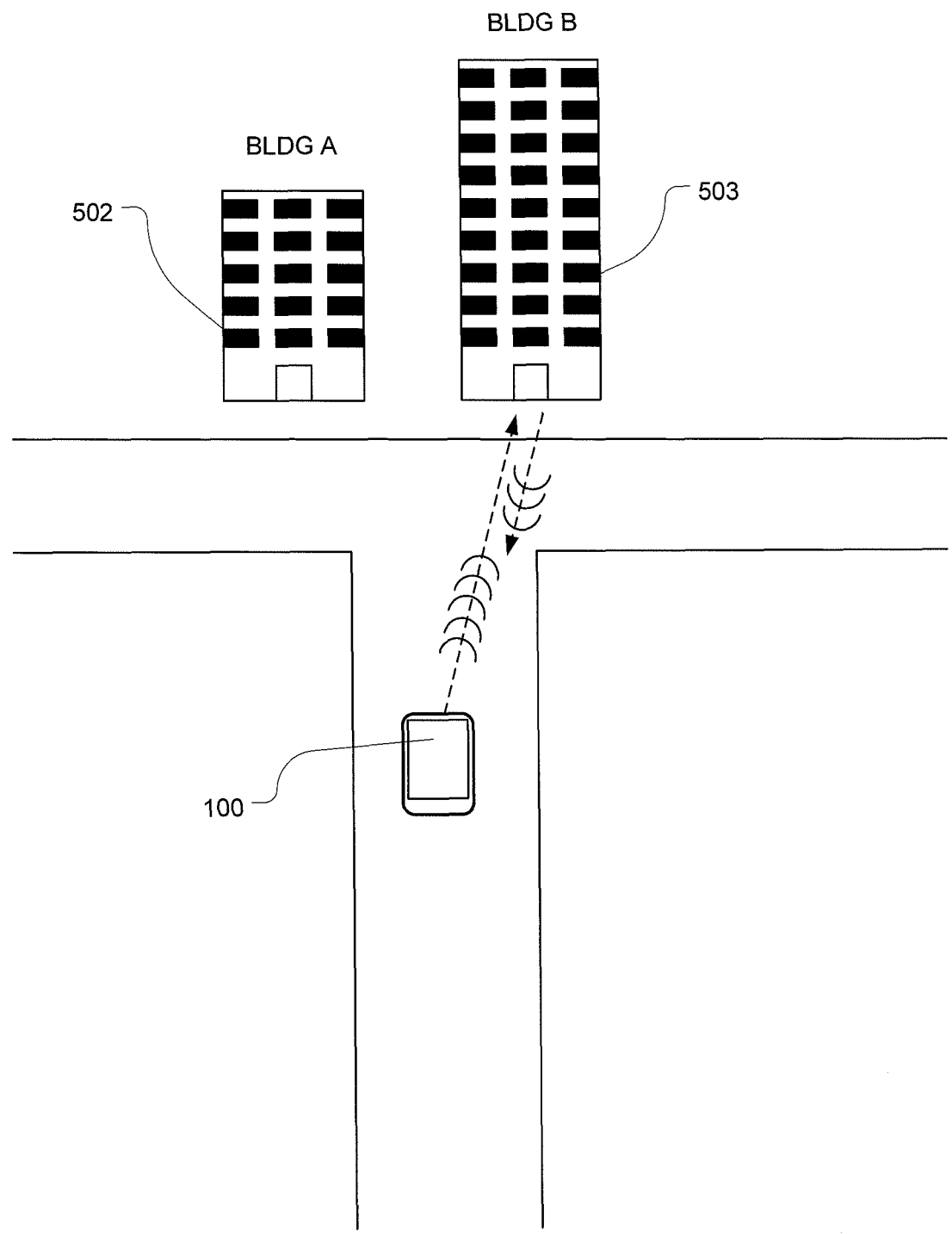
FIG. 14 depicts a rangefinding technique using a wave-emitting and receiving rangefinding device such as a laser, radar or infrared beam for determining the position of an object in the image.

FIG. 14 depicts a rangefinding technique using a wave-emitting rangefinding device such as a laser, radar or infrared beam for determining the relative position of an object in the image. The mobile device 100 may also use a compass to determine its orientation.

Another aspect of the technology is an image overlay technique that immediately uses the images of the actual physical surroundings while the map database is being updated. In one implementation, the mobile device can update its own map data and render a new map with the new map data. In another implementation, the mobile device offloads the creation of new map data to the map server or other server and awaits new map data to render a new map onscreen. In the latter scenario, where data is offloaded, there is a lag in updating the map database due to the computation time for determining the location of the new object and the delivery time for delivering this new map data to the map server (not to mention the time needed for the map server to integrate the new map data). During this lag period, the device is still without an accurate portrayal of its surroundings. One solution to this problem is to use the captured images to create composite three-dimensional renderings that incorporate the images as the backdrop to a two- or three-dimensionally rendered map.

In other words, the image taken by the camera may be simultaneously displayed in real-time as a backdrop to a three-dimensionally rendered map of an area corresponding to the current position of the mobile device.

This means that new objects not in the map database can be seen in the background or backdrop image. This technique immediately provides an accurate portrayal of the actual physical surroundings without having to wait for the map database to be updated and for new map data to be downloaded to the device.

Figure 15:
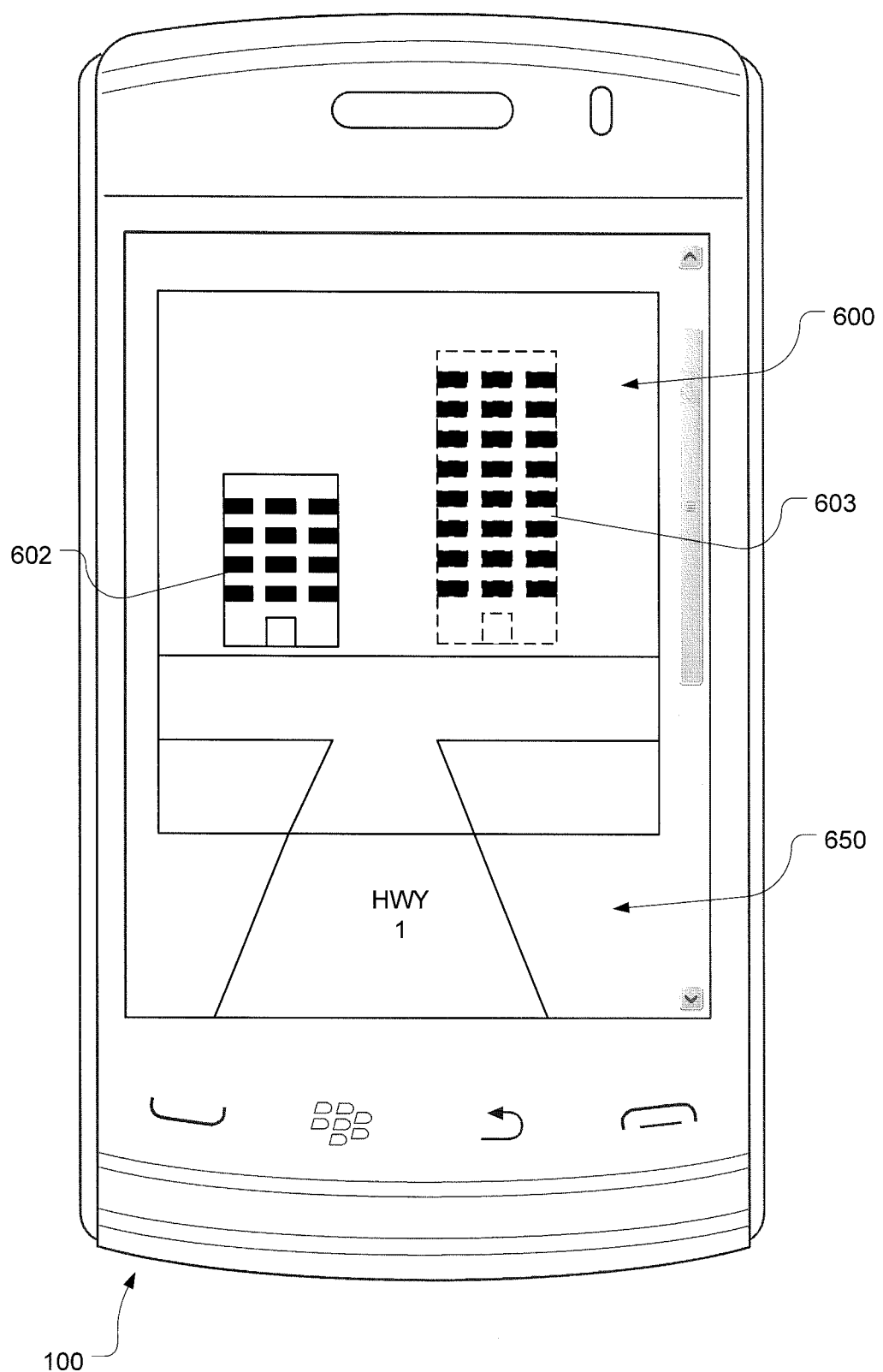
FIG. 15 depicts an example of an image overlay technique for presenting a composite three-dimensional image composed in the background of an image taken by the mobile device and in the foreground of three-dimensional rendering of map data.
Figure 16:
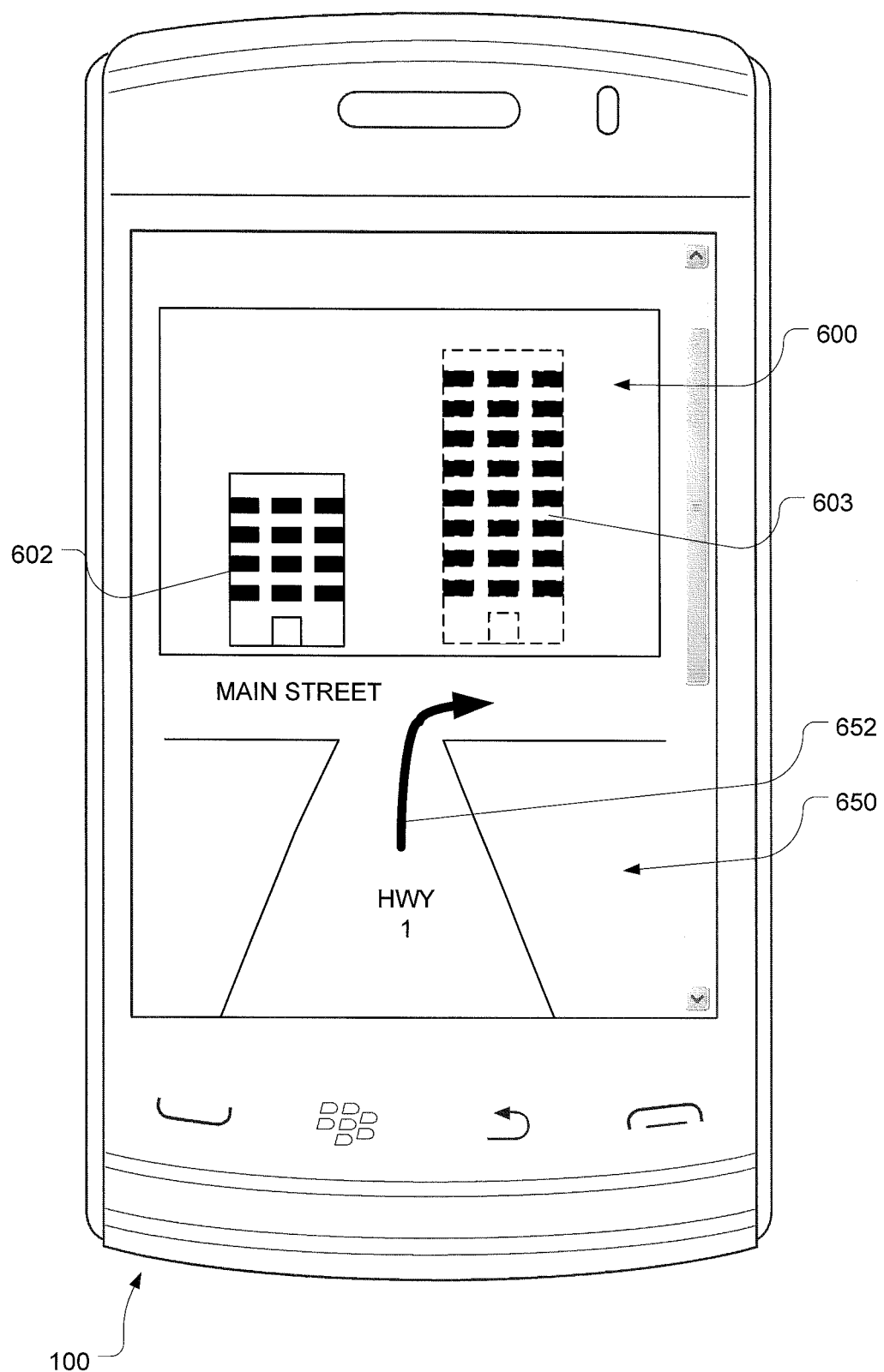
FIG. 16 depicts another example of the image overlay technique where the image has been cropped.

FIG. 15 depicts an example of an image overlay technique for presenting a composite three-dimensional image composed in the background of an image taken by the mobile device and in the foreground of a three-dimensional rendering of map data. FIG. 16 depicts another example of the image overlay technique where the image has been cropped to provide more foreground. The amount of foreground may thus be varied or configured by the user. The inclination or tilt angle of the mobile device may also be measured when the images are captured to determine the real height of an object in the image(s). This angle may be measured using any suitable onboard tilt sensor or inclinometer. Optionally, the new object in the photo may be visually modified to indicate to the user that the object is new. For the sake of illustration, Building B is shown in dashed lines in FIG. 15 and FIG. 16 although any other visual indicator, frame, highlight, coloration, halo, etc. may be used to visually emphasize the new object.

Figure 17:
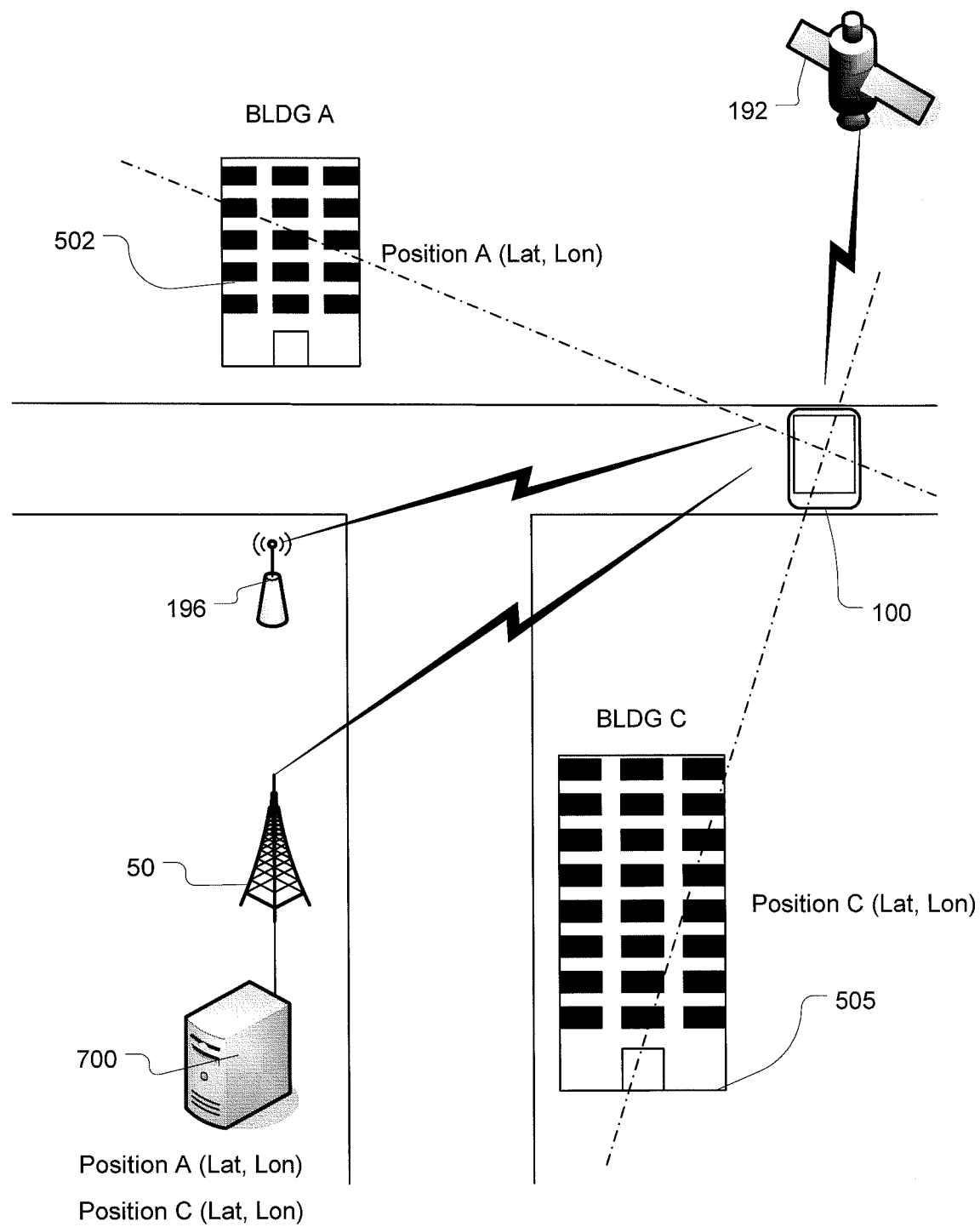
FIG. 17 depicts an example of a technique for improving the positional accuracy of the mobile device by referencing nearby objects for which predetermined position coordinates are available.

Another aspect of the technology uses predetermined position coordinates for objects in the surrounding area as reference points for improving the accuracy of the device's positioning system. FIG. 17 depicts an example of a technique for improving the positional accuracy of the mobile device by referencing nearby objects for which predetermined position coordinates are available. In this example, position coordinates for Building A and Building C are stored at server 700. This server 700 delivers these coordinates to the mobile device. Based on images taken of these buildings, its own current location may be calculated. In other words, this method entails instructing the camera to capture one or more photos of recognizable objects, geotagging the one or more photos using the current location as determined by the GPS receiver, identifying the recognizable objects in the one or more geotagged photos, obtaining position coordinates for the recognizable objects, and refining the current position of the wireless communications device based on the position coordinates for the recognizable objects. The recognizable objects thus serve as fixed reference points for the mobile device 100.

The foregoing methods can be implemented in hardware, software, firmware or as any suitable combination thereof. That is, the computer-readable medium comprises instructions in code which when loaded into memory and executed on a processor of a mobile device is adapted to any of the foregoing method steps.

These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A method of updating map data, the method comprising:
   determining a current position of a wireless communications device;
   capturing an image using a camera of the wireless communications device;
   processing the image for transmission over a wireless network, the processing comprising one of creating a low resolution version of the image and creating a wire mesh version of the image;
   transmitting the proceed image to a man server,
   receiving a message from the man server in response to the processed image, the message including an identification of an object from the processed image and a location of a landmark in a map database from the map server, the landmark corresponding to the object;
   using the location of the landmark to refine the current position of the wireless communications device;
   determining a location of a second object in the image;
   using the refined position of the wireless communications device and the location of the second object to create new map data; and
   updating the map database with the new map data.

2. The method as claimed in claim 1 further comprising:
   determining the current position of the wireless communications device using a GPS receiver in the wireless communications device; and
   determining a relative position of the second object relative to the current position of the wireless communications device.

3. The method as claimed in claim 2 wherein determining the relative position of the second object comprises using multiple images to triangulate the relative position of the object.

4. The method as claimed in claim 2 wherein determining the relative position of the second object comprises using a stereoscopic camera to determine the relative position of the object.

5. The method as claimed in claim 2 wherein determining the relative position of the second object comprises using a rangefinder and compass to determine the relative position of the object.

6. The method as claimed in claim 2 wherein determining the current position of the wireless communications device comprises receiving location information from navigation signals of one of GPS services and terrestrial signals.

7. The method as claimed in claim 1 wherein updating the map database comprises wirelessly transmitting the new map data to the map server.

8. The method as claimed in claim 1 further wherein updating the map database comprises updating a local map database stored on a wireless device.

9. A non-transitory computer-readable medium comprising instructions in code which when loaded into memory and executed on a processor of a wireless communications device is adapted to update map data in a map database by:
   determining a current position of the wireless communications device;
   capturing an image using a camera;
   processing the image for transmission over a wireless network, the processing comprising one of creating a low resolution version of the image and creating a wire mesh version of the image;
   transmitting the processed image to a map server;
   receiving a message from the man server in response to the processed image, the message including an identification of an object from the processed image and a location of a landmark in a map database from the map server, the landmark corresponding to the object;

using the location of the landmark to refine the current position of the wireless communications device;

determining a location of a second object in the image;

using the refined position of the wireless communications device and the location of the second object to create new map data; and updating the map database with the new map data.

10. The non-transitory computer-readable medium as claimed in claim 9 comprising code that causes the device to:

determine the current position of the wireless communications device using a GPS receiver in the wireless communications device; and determine a relative position of the second object relative to the current position of the wireless communications device.

11. A wireless communications device for updating map data, the device comprising:

a camera;

a Global Positioning System (GPS) receiver;

a memory for storing the image, the memory being operatively coupled to a processor; and a radiofrequency transceiver operatively coupled to the processor;

wherein the processor is configured to:

determine a current position of the wireless communications device;

capture an image using the camera;

process the image for transmission over a wireless network, the processing comprising one of creating a low resolution version of the image and creating a wire mesh version of the image;

transmit the processed image to a map server with the radiofrequency transceiver;

receive a message from the map server in response to the processed image, the message including an identification of an object from the processed image and a location of a landmark in a man database from the man server, the landmark corresponding to the object;

use the location of the landmark to refine the current position of the wireless communications device;

determine a location of a second object in the image;

use the refined position of the wireless communications device and the location of the second object to create new map data; and update the man database with the new map data.

12. The device as claimed in claim 11 wherein updating the map database comprises transmitting the new map data to the map server.

13. The device as claimed in claim 11 comprising a rangefinder and a compass for determining the relative position of the second object in the image relative to the current location of the device.

14. The device as claimed in claim 11 wherein the processor is configured to:

cause the camera to take multiple images of the object from different positions; and triangulate the relative position of the second object from the multiple images.

15. The method as claimed in claim 1 further comprising simultaneously displaying in real-time the image taken by the camera as a backdrop to a three-dimensionally rendered map of an area corresponding to the current position of the device.

16. The computer-readable medium as claimed in claim 9 wherein the code is configured to simultaneously display in real-time the image taken by the camera as a backdrop to a three-dimensionally rendered map of an area corresponding to the current position of the device.

17. The device as claimed in claim 11 wherein the processor is configured to cause a display to simultaneously render in real-time the image taken by the camera as a backdrop to a three-dimensionally rendered map of an area corresponding to the current position of the device.

* * * * *